(12) United States Patent
Jiang et al.

(10) Patent No.: US 12,155,338 B2
(45) Date of Patent: Nov. 26, 2024

(54) MOTOR DRIVER HAVING MOTOR ABNORMALITY DETECTION MECHANISM

(71) Applicant: ANPEC ELECTRONICS CORPORATION, Hsinchu (TW)

(72) Inventors: Jyun-Ping Jiang, Hsinchu (TW); Shih-Hai Chien, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 170 days.

(21) Appl. No.: 18/105,943

(22) Filed: Feb. 6, 2023

(65) Prior Publication Data
US 2024/0146216 A1   May 2, 2024

(30) Foreign Application Priority Data

Nov. 1, 2022   (TW) .................................. 111141504

(51) Int. Cl.
*H02P 6/16*      (2016.01)
*H02P 29/024*   (2016.01)
*H02P 3/22*      (2006.01)

(52) U.S. Cl.
CPC .............. *H02P 6/16* (2013.01); *H02P 29/024* (2013.01); *H02P 3/22* (2013.01)

(58) Field of Classification Search
CPC ............ H02H 7/26; H02H 1/04; H02H 3/027; H02H 7/09; H02H 9/042; H02H 9/043; H02P 6/12; H02P 8/36; H02P 29/60; H02P 6/16; H02P 3/22; H04Q 1/032; G05B 2219/21145; G05B 2219/21154; H01L 23/62; H01R 9/2441; H01R 9/2641; H01R 13/6666; H02K 11/26; H03K 17/08; H05K 1/0257

USPC .................. 318/400.22, 400.21, 706, 400.38
See application file for complete search history.

(56) References Cited

U.S. PATENT DOCUMENTS

| | | | |
|---|---|---|---|
| 2002/0039013 A1* | 4/2002 | Murata ..................... | H02P 6/22 318/727 |
| 2024/0063743 A1* | 2/2024 | Lee ......................... | F16H 61/12 |

OTHER PUBLICATIONS (JP 4719218 B2)Opening And Closing Body Drive Devic Date Published 2011-07-0 (Year: 2011).*

* cited by examiner

Primary Examiner — Jorge L Carrasquillo
(74) Attorney, Agent, or Firm — Li & Cai Intellectual Property (USA) Office

(57) ABSTRACT

A motor driver having a motor abnormality detection mechanism is provided. A motor position detecting circuit detects a change in a state of a rotor of the motor switching between a plurality of magnetic pole positions to output a commutation signal. An abnormality determining circuit, according the commutation signal, determines a plurality of time intervals during which the rotor of the motor is switched to the plurality of magnetic pole positions respectively to output an abnormality detected signal. A rotational protection controller circuit outputs a rotation protecting signal to a motor driving circuit according to the abnormality detected signal. A motor driving circuit drives the motor according to the rotation protecting signal. When the abnormality detected signal received by the rotational protection controller circuit indicates that the motor abnormally rotates, the rotational protection controller circuit adjusts the rotation protecting signal outputted to the motor driving circuit.

14 Claims, 7 Drawing Sheets

MOTOR DRIVER HAVING MOTOR ABNORMALITY DETECTION MECHANISM

CROSS-REFERENCE TO RELATED PATENT APPLICATION

This application claims the benefit of priority to Taiwan Patent Application No. 111141504, filed on Nov. 1, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor driver having a motor abnormality detection mechanism.

BACKGROUND OF THE DISCLOSURE

In electronic devices, fans are used to cool heat generating components such as processors. When the heat generating components are cooled down by the fans, motors of the fans must be accurately controlled to rotate such that the fans can properly cool down the heat generating components with efficiency.

Generally, rotors in the motors of the fans are made of permanent magnet materials. In manufacturing processes of each of these motors, areas of a plurality of magnetic pole positions of the rotor are not evenly distributed and are not asymmetrical to each other. Under this condition, a conventional motor driver still drives the motor in the same manner, such as to cause an abnormal rotation of the motor, so that the heat generating components cannot be cooled down effectively.

SUMMARY OF THE DISCLOSURE

In response to the above-referenced technical inadequacies, the present disclosure provides a motor driver having a motor abnormality detection mechanism. The motor driver is applicable to a motor. The motor driver includes a motor position detecting circuit, an abnormality determining circuit, a rotational protection controller circuit and a motor driving circuit. The motor position detecting circuit is disposed on the motor. The motor position detecting circuit is configured to detect a change in a state of a rotor of the motor switching between a plurality of magnetic pole positions to output a commutation signal. A plurality of working periods and a plurality of non-working periods of a plurality of waveforms of the commutation signal represent a plurality of time intervals during which the rotor of the motor is switched to the plurality of magnetic pole positions respectively. The abnormality determining circuit is connected to the motor position detecting circuit. The abnormality determining circuit is configured to determine whether or not the motor abnormally rotates to output an abnormality detected signal according to the commutation signal indicating the plurality of time intervals during which the rotor of the motor is switched to the plurality of magnetic pole positions respectively. The rotational protection controller circuit is connected to the abnormality determining circuit. The rotational protection controller circuit is configured to output a rotation protecting signal according to the abnormality detected signal from the abnormality determining circuit. The motor driving circuit is connected to the rotational protection controller circuit and the motor. The motor driving circuit is configured to drive the motor according to the rotation protecting signal. When the abnormality detected signal received from the abnormality determining circuit by the rotational protection controller circuit indicates that the motor abnormally rotates, the rotational protection controller circuit adjusts the rotation protecting signal outputted to the motor driving circuit.

In certain embodiments, when the abnormality determining circuit determines that time lengths of the plurality of time intervals during which the rotor of the motor is switched to the plurality of magnetic pole positions respectively are not equal to each other according to the commutation signal, the abnormality determining circuit determines that the motor abnormally rotates.

In certain embodiments, when the abnormality determining circuit determines that a time difference between each two ones of time lengths of the plurality of time intervals during which the rotor of the motor is switched to the plurality of magnetic pole positions respectively is larger than a time difference threshold according to the commutation signal, the abnormality determining circuit determines that the motor abnormally rotates.

In certain embodiments, when the rotational protection controller circuit determines that the motor abnormally rotates, the rotational protection controller circuit controls the motor driving circuit to forcibly stop the motor from rotating.

In certain embodiments, when the rotational protection controller circuit determines that time during which the motor abnormally rotates is larger than a time threshold, the rotational protection controller circuit controls the motor driving circuit to forcibly stop the motor from rotating.

In certain embodiments, when the rotational protection controller circuit determines that the time during which the motor abnormally rotates is not larger than the time threshold, the rotational protection controller circuit controls the motor driving circuit to drive the motor such that the motor is gradually restored to a normal rotation state.

In certain embodiments, when the rotational protection controller circuit determines that the time during which the motor abnormally rotates is not larger than the time threshold, the rotational protection controller circuit controls the motor driving circuit to drive the motor such that the motor is gradually restored to a normal rotation state within a plurality of restoration stage time intervals.

In certain embodiments, when the rotational protection controller circuit determines that the motor abnormally rotates, the rotational protection controller circuit determines that a motor protection mechanism needs to be started to output the rotation protecting signal having a protection mechanism starting command.

In certain embodiments, the motor driving circuit adjusts a driving operation performed on the motor to extend commutation time of the motor according to the protection mechanism starting command of the rotation protecting signal.

In certain embodiments, the motor driving circuit shortens a working period of a signal outputted to the motor according to the protection mechanism starting command of the rotation protecting signal.

In certain embodiments, the motor driving circuit includes a driver circuit and an output stage circuit. The driver circuit is connected to the rotational protection controller circuit. The output stage circuit is connected to the driver circuit and the motor. The driver circuit drives the output stage circuit to operate so as to drive the motor according to the rotation protecting signal from the rotational protection controller circuit.

In certain embodiments, the output stage circuit includes a plurality of switch component groups. Each of the plurality of switch component groups includes a high-side switch and a low-side switch. In each of the plurality of switch component groups, a first terminal of the high-side switch is coupled to a common voltage, a second terminal of the high-side switch is connected to a first terminal of the low-side switch, and a second terminal of the low-side switch is grounded. A control terminal of the high-side switch and a control terminal of the low-side switch in each of the plurality of switch component groups are connected to an output terminal of the driver circuit. A node between the second terminal of the high-side switch and the first terminal of the low-side switch in each of the plurality of switch component groups is connected to one of a plurality of terminals of the motor. The plurality of switch component groups are respectively connected to the plurality of terminals of the motor.

In certain embodiments, the motor driver further includes a switch circuit. The switch circuit includes a plurality of switch component groups. Each of the plurality of switch component groups includes a high-side switch and a low-side switch. In each of the plurality of switch component groups, a first terminal of the high-side switch is coupled to a common voltage, a second terminal of the high-side switch is connected to a first terminal of the low-side switch, and a second terminal of the low-side switch is grounded. A control terminal of the high-side switch and a control terminal of the low-side switch in each of the plurality of switch component groups are connected to an output terminal of the driver circuit. A node between the second terminal of the high-side switch and the first terminal of the low-side switch in each of the plurality of switch component groups is connected to one of a plurality of terminals of the motor. The plurality of switch component groups are respectively connected to the plurality of terminals of the motor.

In certain embodiments, the motor driver further includes a control circuit. The control circuit is connected between the motor position detecting circuit and the rotational protection controller circuit. The control circuit is configured to control the rotational protection controller circuit according to the commutation signal from the motor position detecting circuit.

As described above, the present disclosure provides the motor driver having the motor abnormality detection mechanism. The motor driver of the present disclosure detects the time intervals during which the rotor of the motor is switched to the plurality of magnetic pole positions, respectively. The motor driver of the present disclosure, according to the detected time intervals respectively during which the rotor of the motor is switched to the plurality of magnetic pole positions, determines whether or not the motor abnormally rotates and accordingly performs corresponding operations.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
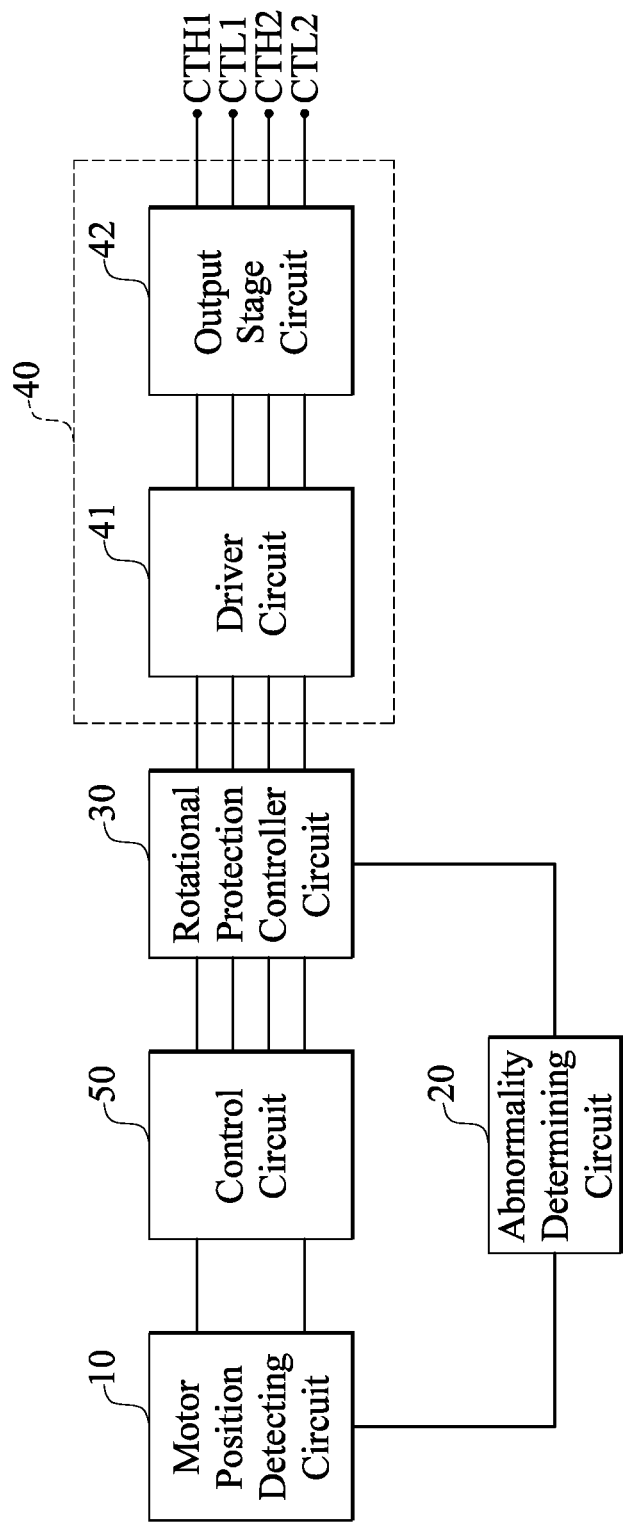
FIG. 1 is a block diagram of a motor driver having a motor abnormality detection mechanism according to a first embodiment of the pre sent disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 3:
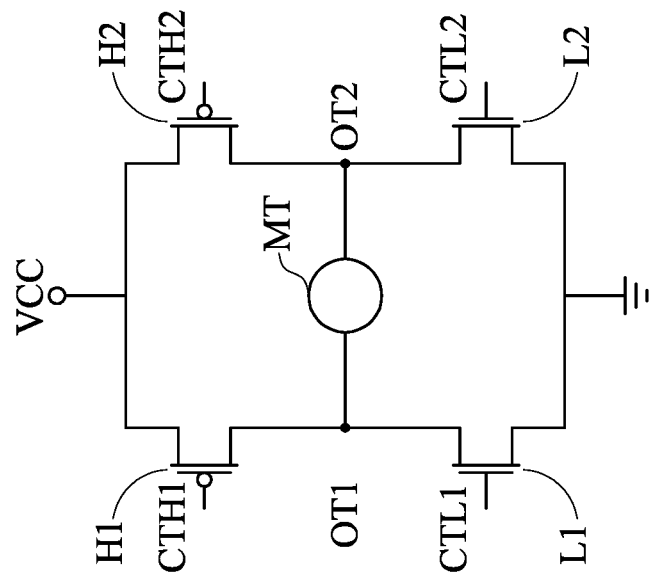
FIG. 3 is a block diagram of a motor and an output stage circuit of the motor driver having the motor abnormality detection mechanism according to the first and second embodiments of the present disclosure.
Figure 4:
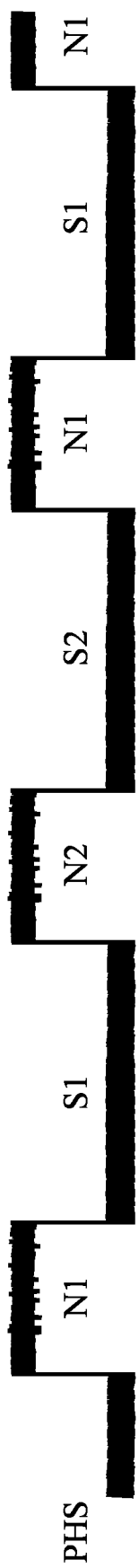
FIG. 4 is a waveform diagram of a commutation signal of the motor detected by the motor driver having the motor abnormality detection mechanism according to the first and second embodiments of the present disclosure.

Reference is made to FIGS. 1, 3 and 4, in which FIG. 1 is a block diagram of a motor driver having a motor abnormality detection mechanism according to a first embodiment of the present disclosure, FIG. 3 is a block diagram of a motor and an output stage circuit of the motor driver having the motor abnormality detection mechanism according to the first and second embodiments of the present disclosure, and FIG. 4 is a waveform diagram of a commutation signal of the motor detected by the motor driver having the motor abnormality detection mechanism according to the first and second embodiments of the present disclosure.

As shown in FIG. 1, the motor driver of the present disclosure may include a motor position detecting circuit 10, an abnormality determining circuit 20, a rotational protection controller circuit 30, a motor driving circuit 40 and a control circuit 50. The motor driving circuit 40 may include a driver circuit 41 and an output stage circuit 42.

The motor position detecting circuit 10 may include one or more Hall sensors and may be disposed on a motor MT. The motor position detecting circuit 10 is connected to the abnormality determining circuit 20 and the control circuit 50. The abnormality determining circuit 20 is connected to the rotational protection controller circuit 30. The rotational protection controller circuit 30 is connected to the control circuit 50 and the driver circuit 41. The driver circuit 41 is connected to the output stage circuit 42. The output stage circuit 42 is connected to the motor MT.

The motor driver of the embodiment of the present disclosure may further include a switch circuit. The switch circuit may include a plurality of switch component groups. Each of the plurality of switch component groups includes a high-side switch and a low-side switch. For example, as shown in FIG. 3, a first switch component group includes a first high-side switch H1 and a first low-side switch L1, and a second switch component group includes a second high-side switch H2 and a second low-side switch L2, but the present disclosure is not limited thereto.

A first terminal of the first high-side switch H1 is coupled to a common voltage VCC. A second terminal of the first high-side switch H1 is connected to a first terminal of the first low-side switch L1. A second terminal of the first low-side switch L1 is grounded. A node between the second terminal of the first high-side switch H1 and the first terminal of the first low-side switch L1 may be connected to a first terminal OT1 of the motor MT (such as, but not limited to, a single-phase motor).

A first terminal of the second high-side switch H2 is coupled to the common voltage VCC. A second terminal of the second high-side switch H2 is connected to a first terminal of the second low-side switch L2. A second terminal of the first low-side switch L1 and a second terminal of the second low-side switch L2 are grounded. A node between the second terminal of the second high-side switch H2 and the first terminal of the second low-side switch L2 may be connected to a second terminal OT2 of the motor MT.

An output terminal of the output stage circuit 42 as shown in FIG. 1 may be connected to a control terminal of each of plurality of switch components of the switch circuit. For example, the output terminal of the output stage circuit 42 as shown in FIG. 1 may be connected to a control terminal CTH1 of the first high-side switch H1, a control terminal CTL1 of the first low-side switch L1, a control terminal CTH2 of the second high-side switch H2, and a control terminal CTL2 of the second low-side switch L2 as shown in FIG. 3.

The motor position detecting circuit 10 detects a change in a state of a rotor of the motor MT switching between a plurality of magnetic pole positions to output a commutation signal such as a commutation signal PHS shown in FIG. 4.

Generally, the rotor of the motor MT is switched between 2N magnetic pole positions, wherein N is a positive integer value being larger than 1. In the embodiment, it is assumed that N is 2, the rotor of the motor MT is switched between four magnetic pole positions N1, S1, N2, S2 to switch a phase of the motor MT. In the embodiment, the motor position detecting circuit 10 detects the change in the state of the rotor of the motor MT switching between the four magnetic pole positions N1, S1, N2, S2 to output the commutation signal PHS as shown in FIG. 4, but the present disclosure is not limited thereto.

It is worth noting that, as shown in FIG. 4, a plurality of working periods and a plurality of non-working periods of a plurality of waveforms of the commutation signal PHS are a plurality of time intervals during which the rotor of the motor MT are switched to the magnetic pole positions N1, S1, N2, S2, respectively.

In an optimal state, areas occupied by the plurality of magnetic pole positions in the rotor of the motor MT should be equal to each other. For example, the four pole positions N1, S1, N2, S2 should be averagely distributed such that each of the four pole positions N1, S1, N2, S2 occupies a quarter of a total area occupied by all of the pole positions N1, S1, N2, S2 of the rotor of the motor MT. Under this condition, if the motor MT is driven to continually rotate at the same rotational speed, in the commutation signal PHS outputted by the motor position detecting circuit 10, time lengths of the plurality of time intervals during which the rotor of the motor MT are switched to the magnetic pole positions N1, S1, N2, S2, respectively, are equal to each other.

However, in an actual state, the areas occupied by the plurality of magnetic pole positions of the rotor of the motor MT in the motor MT may be not equal to each other. For example, the four pole positions N1, S1, N2, S2 are not averagely distributed, and any one of the four pole positions N1, S1, N2, S2 does not occupy the quarter of the total area occupied by all of the pole positions N1, S1, N2, S2 of the rotor of the motor MT. That is, the four pole positions N1, S1, N2, S2 of the rotor of the motor MT are not symmetrical to each other. As a result, as shown in FIG. 4, in the commutation signal PHS outputted by the motor position detecting circuit 10, the time lengths of the plurality of time intervals during which the rotor of the motor MT are switched to the magnetic pole positions N1, S1, N2, S2 respectively are not equal to each other.

It is worth noting that, the abnormality determining circuit 20, according to the commutation signal PHS outputted by the motor position detecting circuit 10, determines whether or not the time lengths of the plurality of time intervals during which the rotor of the motor MT is switched to the plurality of magnetic pole positions N1, S1, N2, S2 respectively are equal to each other, and accordingly determines whether or not the motor MT abnormally rotates to output an abnormality detected signal.

When the abnormality determining circuit 20 determines that the time lengths of the plurality of time intervals during which the rotor of the motor MT is switched to the plurality of magnetic pole positions N1, S1, N2, S2 respectively are not equal to each other according to the commutation signal PHS, the abnormality determining circuit 20 determines that the motor MT abnormally rotates to output the abnormality detected signal having an abnormality indication message.

Alternatively, the abnormality determining circuit 20 may, according to the commutation signal PHS, determine that a time difference between each two of the time lengths of the plurality of time intervals during which the rotor of the motor MT is switched to the plurality of magnetic pole positions N1, S1, N2, S2 respectively is larger than a time difference threshold. Under this condition, the abnormality determining circuit 20 determines that the motor MT abnormally rotates to output the abnormality detected signal having the abnormality indication message.

The control circuit 50 outputs one or more main control signals according to one or more commutation signals from the motor position detecting circuit 10. The rotational protection controller circuit 30 outputs one or more rotation protecting signals to the driver circuit 41 according to the one or more main control signals and the abnormality detected signal.

When the rotational protection controller circuit 30 receives the abnormality detected signal having the abnormality indication message indicating that the motor MT abnormally rotates, the rotational protection controller circuit 30 adjusts the one or more rotation protecting signals outputted to the driver circuit 41.

The driver circuit 41 outputs one or more driving signals to the output stage circuit 42 according to the one or more rotation protecting signals.

The output stage circuit 42, according to the one or more driving signals, operates to output one or more output stage signals to the control terminal CTH1 of the first high-side switch H1, the control terminal CTL1 of the first low-side switch L1, the control terminal CTH2 of the second high-side switch H2 and the control terminal CTL2 of the second low-side switch L2 in the switch circuit as shown in FIG. 3. The switch circuit operates to drive the motor MT according to the one or more output stage signals.

Figure 2:
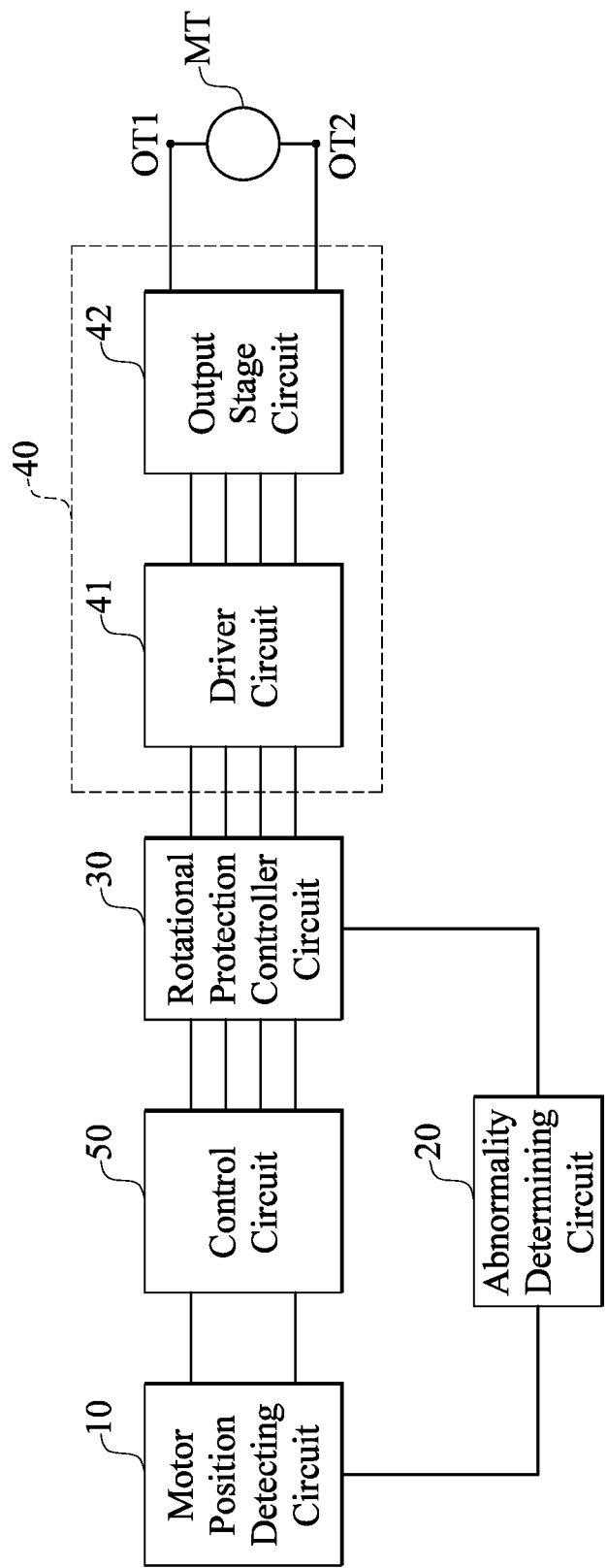
FIG. 2 is a block diagram of a motor driver having a motor abnormality detection mechanism according to a second embodiment of the pre sent disclosure.

Reference is made to FIGS. 2 and 3, in which FIG. 2 is a block diagram of a motor driver having a motor abnormality detection mechanism according to a second embodiment of the present disclosure, and FIG. 3 is a block diagram of a motor and an output stage circuit of the motor driver having the motor abnormality detection mechanism according to the first and second embodiments of the present disclosure.

The same descriptions of the first and second embodiments of the present disclosure are not repeated herein. Differences between the first and second embodiments are described in the following.

The output stage circuit 42 as shown in FIG. 2 includes the first high-side switch H1, the first low-side switch L1, the second high-side switch H2 and the second low-side switch L2 as shown in FIG. 3.

The control terminal CTH1 of the first high-side switch H1 of the output stage circuit 42 and the control terminal CTL1 of the first low-side switch L1 of the output stage circuit 42 are connected to an output terminal of the driver circuit 41.

The first terminal of the first high-side switch H1 is coupled to the common voltage VCC. The second terminal of the first high-side switch H1 is connected to the first terminal of the first low-side switch L1. The second terminal of the first low-side switch L1 is grounded. The node between the second terminal of the first high-side switch H1 and the first terminal of the first low-side switch L1 may be connected to the first terminal OT1 of the motor MT.

The control terminal CTH2 of the second high-side switch H2 of the output stage circuit 42 and the control terminal CTL2 of the second low-side switch L2 of the output stage circuit 42 are connected to the output terminal of the driver circuit 41.

The first terminal of the second high-side switch H2 is coupled to the common voltage VCC. The second terminal of the second high-side switch H2 is connected to the first terminal of the second low-side switch L2. The second terminal of the first low-side switch L1 and the second terminal of the second low-side switch L2 are grounded. The node between the second terminal of the second high-side switch H2 and the first terminal of the second low-side switch L2 may be connected to the second terminal OT2 of the motor MT.

The driver circuit 41, according to the rotation protecting signals from the rotational protection controller circuit 30, drives the first high-side switch H1, the first low-side switch L1, the second high-side switch H2 and the second low-side switch L2 of the output stage circuit 42 to operate so as to drive the motor MT.

Figure 5:
FIG. 5 is a waveform diagram of signals representing operations that are performed on the motor by a motor driver having a motor abnormality detection mechanism when time during which the motor abnormally rotates is larger than a time threshold according to a third embodiment of the present disclosure.

Reference is made to FIG. 5, which is a waveform diagram of signals representing operations that are performed on the motor by a motor driver having a motor abnormality detection mechanism when time during which the motor abnormally rotates is larger than a time threshold according to a third embodiment of the present disclosure.

The motor driver of the output stage circuit 42 such as the motor driver as shown in FIG. 1 or FIG. 2 performs operations represented by signals as shown in FIG. 5.

The rotational protection controller circuit 30, according to a level of an abnormality detected signal PTA from the abnormality determining circuit 20 as shown in FIG. 5, determines whether or not the motor MT abnormally rotates and determines a time length during which the motor MT abnormally rotates.

When the rotational protection controller circuit 30 determines that the motor MT abnormally rotates, the rotational protection controller circuit 30 may determine that a motor protection mechanism needs to be started to output the rotation protecting signal having a protection mechanism starting command to the driver circuit 41 of the motor driving circuit 40.

The driver circuit 41 of the motor driving circuit 40 may, according to the protection mechanism starting command of the rotation protecting signal, perform the motor protection mechanism on the motor MT to adjust a state of the motor MT. For example, when the motor MT abnormally rotates, the driver circuit 41 of the motor driving circuit 40 reduces a working period of the driving signal outputted to the output stage circuit 42. As a result, rotational speed of the motor MT is reduced or commutation time of the motor MT is delayed, but the present disclosure is not limited thereto.

As shown in FIG. 5, the rotational protection controller circuit 30, according to time during which the abnormality detected signal PTA is maintained at a high level from the abnormality determining circuit 20, determines time T0 during which the motor MT abnormally rotates is larger than a time threshold Ttmp. Under this condition, the rotational protection controller circuit 30 may control the motor driving circuit 40 to adjust the driving performed on the motor MT. For example, as shown in a protection mechanism signal PTPA1 in FIG. 5, the motor driving circuit 40 forcibly stops the motor MT from rotating for periods of time.

Figure 6:
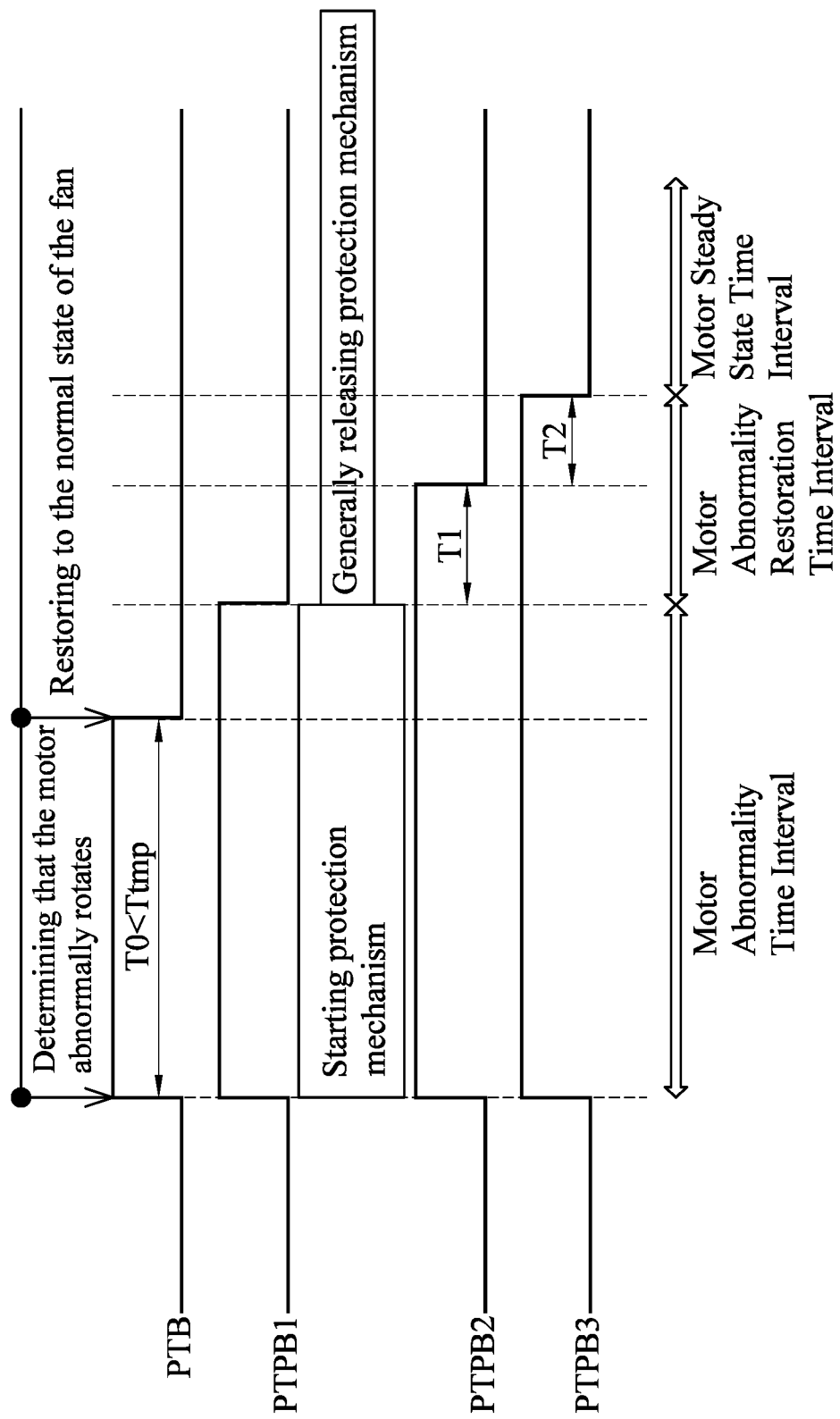
FIG. 6 is a waveform diagram of signals representing operations that are performed on the motor by a motor driver having a motor abnormality detection mechanism when time during which the motor abnormally rotates is not larger than a time threshold according to a fourth embodiment of the present disclosure.
Figure 7:
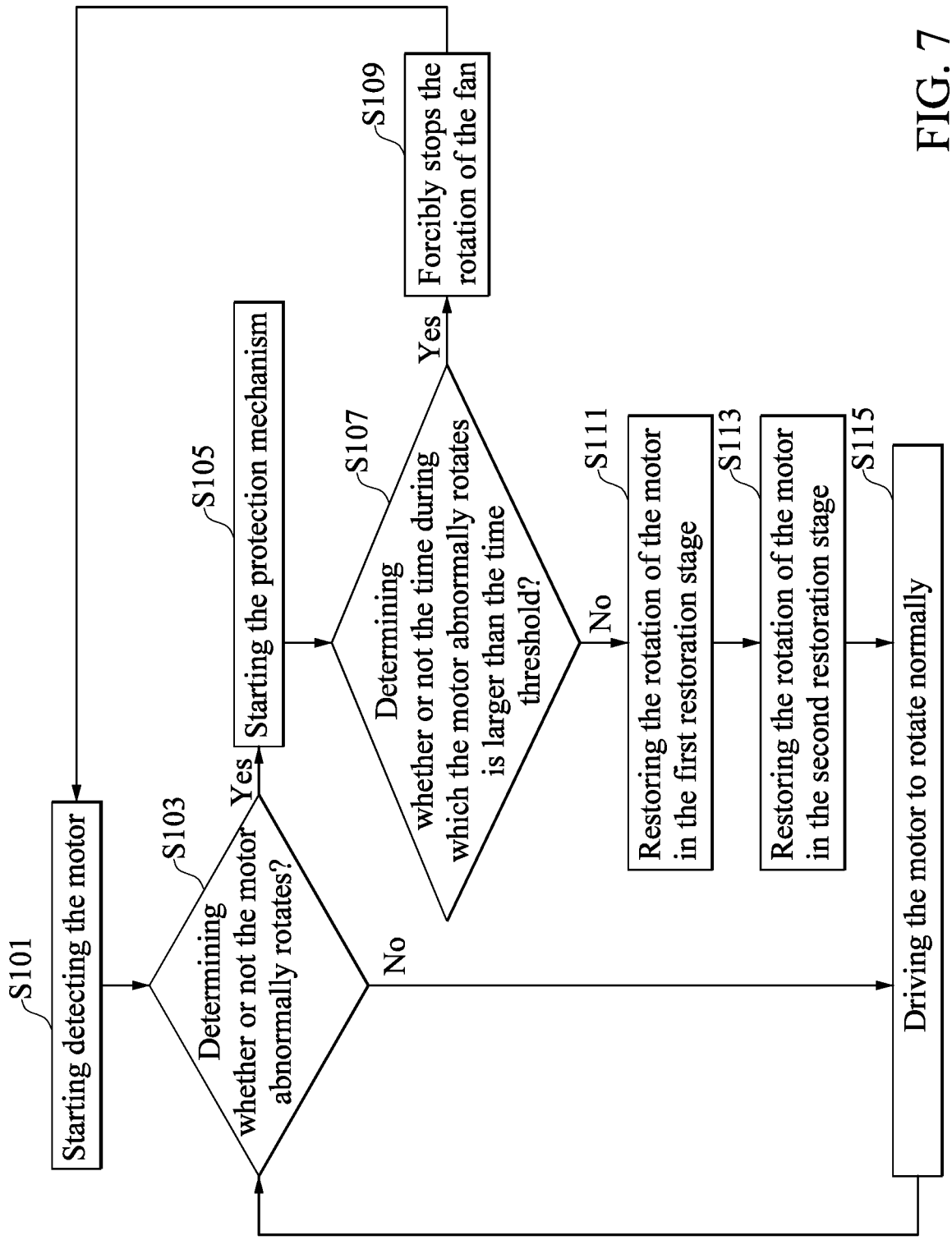
FIG. 7 is flowchart diagram of steps performed by the motor driver having the motor abnormality detection mechanism according to the fourth embodiment of the present disclosure.

Reference is made to FIGS. 6 and 7, in which FIG. 6 is a waveform diagram of signals representing operations that are performed on the motor by a motor driver having a motor abnormality detection mechanism when time during which the motor abnormally rotates is not larger than a time threshold according to a fourth embodiment of the present disclosure, and FIG. 7 is flowchart diagram of steps performed by the motor driver having the motor abnormality detection mechanism according to the fourth embodiment of the pre sent disclosure.

The motor driver of the present disclosure such as, but not limited to the motor driver as shown in FIG. 1 or FIG. 2, performs operations represented by signals as shown in FIG. 6 and steps as shown in FIG. 7.

First, the abnormality determining circuit 20 detects the change in the state of the rotor of the motor MT switching between the plurality of magnetic pole positions to output the commutation signal (step S101) to determine whether or not the motor MT abnormally rotates (step S103) to output a commutation signal PTB as shown in FIG. 6.

When the rotational protection controller circuit 30 determines that the motor MT abnormally rotates according to the commutation signal PTB from the abnormality determining circuit 20, the rotational protection controller circuit 30 may start the motor protection mechanism as shown in the protection mechanism signal PTPA1 of FIG. 6 (step S105).

Then, the rotational protection controller circuit 30, according to the protection mechanism signal PTPA1, determines whether or not the time T0 during which the motor MT abnormally rotates is larger than the time threshold Ttmp (step S107).

When the rotational protection controller circuit 30 determines that the time T0 during which the motor MT abnormally rotates is larger than the time threshold Ttmp, the rotational protection controller circuit 30 controls the motor driving circuit 40 to forcibly stop the motor MT from rotating for periods of times (step S109).

Conversely, when the rotational protection controller circuit 30 determines that the time T0 during which the motor MT abnormally rotates is not larger than the time threshold Ttmp as shown in FIG. 6, the rotational protection controller circuit 30 controls the motor driving circuit 40 to gradually stop performing the motor protection mechanism on the motor MT from a time point at which the motor MT has been partially restored to a normal rotation state as shown in FIG. 6. The motor driving circuit 40 continually drives the motor MT such that the motor MT is gradually restored to the normal rotation state (step S111 to S115).

When the rotational protection controller circuit 30 determines that the time T0 during which the motor MT abnormally rotates is not larger than the time threshold Ttmp, the rotational protection controller circuit 30 may output a plurality of rotational restoration control commands respectively within a plurality of restoration stage time intervals. The motor driving circuit 40 performs different driving restoration operations on the motor MT respectively within the plurality of restoration stage time intervals according to the plurality of rotational restoration control commands. As a result, the motor MT is gradually restored to the normal rotation state respectively within the plurality of restoration stage time intervals (step S111 to S115).

For example, the plurality of restoration stage time intervals may include a first restoration time interval T1 of a rotation restoring signal PTPB2 and a second restoration time interval T2 of a rotation restoring signal PTPB3 as shown in FIG. 6, but the present disclosure is not limited thereto. The motor MT is restored in the first restoration stage of step S111 shown in FIG. 7 within the first restoration time interval T1 of the rotation restoring signal PTPB2 as shown in FIG. 6. The motor MT is restored in the second restoration stage of step S113 shown in FIG. 7 within the second restoration time interval T2 of the rotation restoring signal PTPB3 as shown in FIG. 6. As shown in FIG. 6, after the first restoration time interval T1 (step S111) and the second restoration time interval T2 (step S113) end, the motor MT stably rotates in the normal rotation state (step S115).

In conclusion, the present disclosure provides the motor driver having the motor abnormality detection mechanism. The motor driver of the present disclosure detects the time intervals during which the rotor of the motor is switched to the plurality of magnetic pole positions respectively. The motor driver of the present disclosure, according to the detected time intervals during which the rotor of the motor is switched to the plurality of magnetic pole positions respectively, determines whether or not the motor abnormally rotates and accordingly performs the corresponding operations.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A motor driver having a motor abnormality detection mechanism, which is applicable to a motor, comprising:
   a motor position detecting circuit disposed on the motor and configured to detect a change in a state of a rotor of the motor switching between a plurality of magnetic pole positions to output a commutation signal, wherein a plurality of working periods and a plurality of non-working periods of a plurality of waveforms of the commutation signal represent a plurality of time intervals during which the rotor of the motor is switched to the plurality of magnetic pole positions, respectively;
   an abnormality determining circuit connected to the motor position detecting circuit, and configured to determine whether or not the motor abnormally rotates to output an abnormality detected signal according to the commutation signal indicating the plurality of time intervals during which the rotor of the motor is switched to the plurality of magnetic pole positions, respectively;
   a rotational protection controller circuit connected to the abnormality determining circuit, and configured to output a rotation protecting signal according to the abnormality detected signal from the abnormality determining circuit; and a motor driving circuit connected to the rotational protection controller circuit and the motor, and configured to drive the motor according to the rotation protecting signal;

wherein, when the abnormality detected signal received from the abnormality determining circuit by the rotational protection controller circuit indicates that the motor abnormally rotates, the rotational protection controller circuit adjusts the rotation protecting signal outputted to the motor driving circuit.

2. The motor driver according to claim 1, wherein, when the abnormality determining circuit determines that time lengths of the plurality of time intervals respectively during which the rotor of the motor is switched to the plurality of magnetic pole positions are not equal to each other according to the commutation signal, the abnormality determining circuit determines that the motor abnormally rotates.

3. The motor driver according to claim 1, wherein, when the abnormality determining circuit determines that a time difference between each two of time lengths of the plurality of time intervals respectively during which the rotor of the motor is switched to the plurality of magnetic pole positions is larger than a time difference threshold according to the commutation signal, the abnormality determining circuit determines that the motor abnormally rotates.

4. The motor driver according to claim 1, wherein, when the rotational protection controller circuit determines that the motor abnormally rotates, the rotational protection controller circuit controls the motor driving circuit to forcibly stop the motor from rotating.

5. The motor driver according to claim 1, wherein, when the rotational protection controller circuit determines that time during which the motor abnormally rotates is larger than a time threshold, the rotational protection controller circuit controls the motor driving circuit to forcibly stop the motor from rotating.

6. The motor driver according to claim 5, wherein, when the rotational protection controller circuit determines that the time during which the motor abnormally rotates is not larger than the time threshold, the rotational protection controller circuit controls the motor driving circuit to drive the motor such that the motor is restored to a normal rotation state.

7. The motor driver according to claim 5, wherein, when the rotational protection controller circuit determines that the time during which the motor abnormally rotates is not larger than the time threshold, the rotational protection controller circuit controls the motor driving circuit to drive the motor such that the motor is gradually restored to a normal rotation state within a plurality of restoration stage time intervals.

8. The motor driver according to claim 1, wherein, when the rotational protection controller circuit determines that the motor abnormally rotates, the rotational protection controller circuit determines that a motor protection mechanism needs to be started to output the rotation protecting signal having a protection mechanism starting command.

9. The motor driver according to claim 8, wherein the motor driving circuit adjusts a driving operation performed on the motor to extend commutation time of the motor according to the protection mechanism starting command of the rotation protecting signal.

10. The motor driver according to claim 8, wherein the motor driving circuit shortens a working period of a signal outputted to the motor according to the protection mechanism starting command of the rotation protecting signal.

11. The motor driver according to claim 1, wherein the motor driving circuit includes:

a driver circuit connected to the rotational protection controller circuit; and an output stage circuit connected to the driver circuit and the motor;

wherein the driver circuit drives the output stage circuit to operate so as to drive the motor according to the rotation protecting signal from the rotational protection controller circuit.

12. The motor driver according to claim 11, wherein the output stage circuit includes a plurality of switch component groups, and each of the plurality of switch component groups includes a high-side switch and a low-side switch;

wherein, in each of the plurality of switch component groups, a first terminal of the high-side switch is coupled to a common voltage, a second terminal of the high-side switch is connected to a first terminal of the low-side switch, and a second terminal of the low-side switch is grounded;

wherein a control terminal of the high-side switch and a control terminal of the low-side switch in each of the plurality of switch component groups are connected to an output terminal of the driver circuit;

wherein a node between the second terminal of the high-side switch and the first terminal of the low-side switch in each of the plurality of switch component groups is connected to one of a plurality of terminals of the motor, and the plurality of switch component groups are respectively connected to the plurality of terminals of the motor.

13. The motor driver according to claim 11, further comprising:

a switch circuit including a plurality of switch component groups, wherein each of the plurality of switch component groups includes a high-side switch and a low-side switch;

wherein, in each of the plurality of switch component groups, a first terminal of the high-side switch is coupled to a common voltage, a second terminal of the high-side switch is connected to a first terminal of the low-side switch, and a second terminal of the low-side switch is grounded;

wherein a control terminal of the high-side switch and a control terminal of the low-side switch in each of the plurality of switch component groups are connected to an output terminal of the driver circuit;

wherein a node between the second terminal of the high-side switch and the first terminal of the low-side switch in each of the plurality of switch component groups is connected to one of a plurality of terminals of the motor, and the plurality of switch component groups are respectively connected to the plurality of terminals of the motor.

14. The motor driver according to claim 1, further comprising:

a control circuit connected between the motor position detecting circuit and the rotational protection controller circuit, and configured to control the rotational protection controller circuit according to the commutation signal from the motor position detecting circuit.

\* \* \* \* \*